Figure 1:
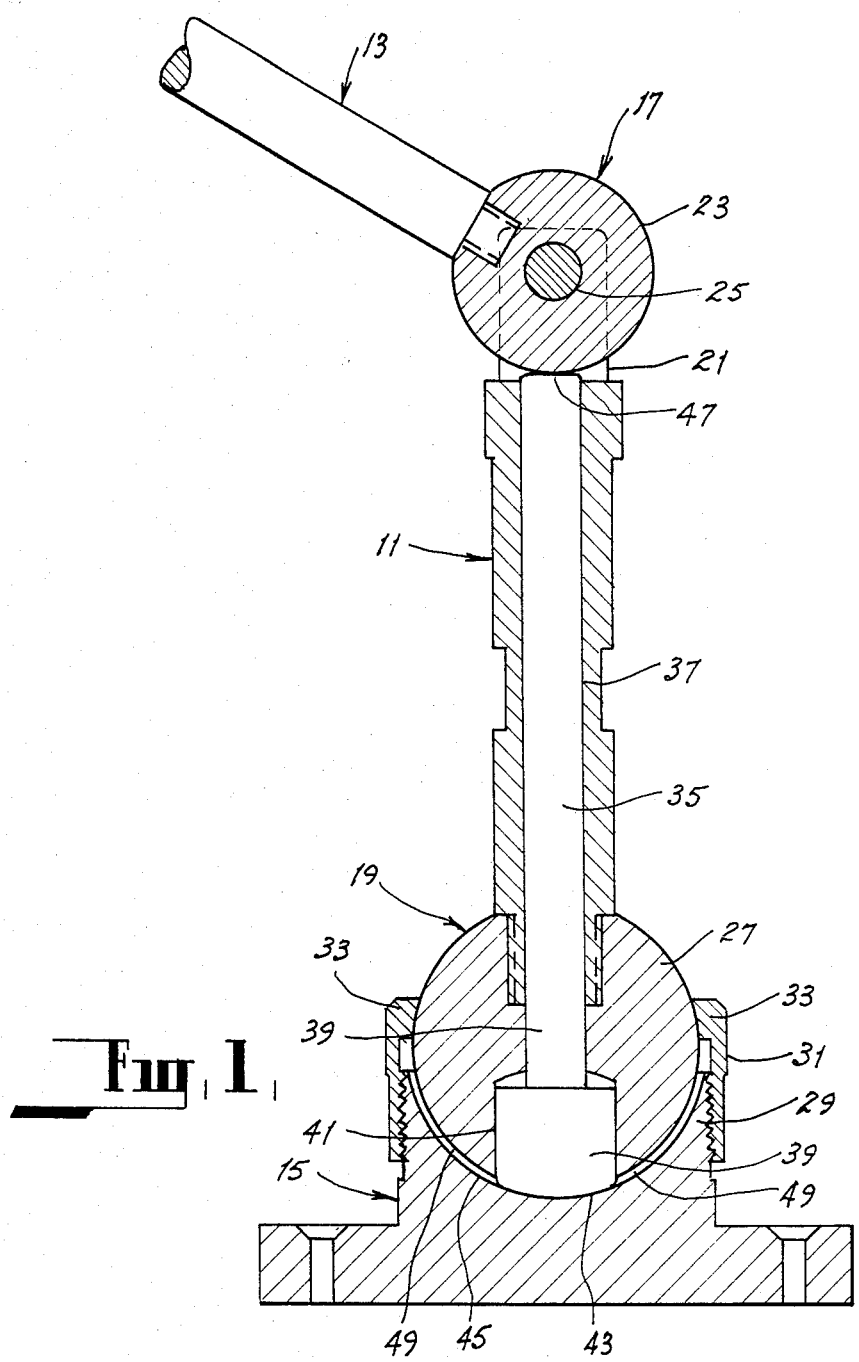

United States Patent [19]

Wallis

[11] Patent Number: 4,531,855
[45] Date of Patent: Jul. 30, 1985

[54] ADJUSTABLE ARM

[76] Inventor: Frederick A. Wallis, 9 Mosaic St., Shelley, Western Australia, Australia

[21] Appl. No.: 576,374

[22] PCT Filed: May 12, 1983

[86] PCT No.: PCT/AU83/00060
§ 371 Date: Jan. 6, 1984
§ 102(e) Date: Jan. 6, 1984

[87] PCT Pub. No.: WO83/04078
PCT Pub. Date: Nov. 24, 1983

[30] Foreign Application Priority Data

May 12, 1982 [AU] Australia .................. PF3970

[51] Int. Cl.³ .............................. F16C 11/06
[52] U.S. Cl. ...................... 403/55; 403/90; 248/160
[58] Field of Search ............ 403/55, 54, 53, 90, 403/76; 248/160, 276

[56] References Cited

U.S. PATENT DOCUMENTS

| 1,645,023 | 10/1927 | Richards | 403/76 X |
| 3,240,516 | 3/1966 | Barish et al. | 403/54 |
| 3,278,207 | 10/1966 | Barish et al. | 403/55 |
| 3,586,281 | 6/1971 | Schumer | 403/90 X |

Primary Examiner—Andrew V. Kundrat
Attorney, Agent, or Firm—Harness, Dickey & Pierce

[57] ABSTRACT

An adjustable arm having a joint (17,19) at each end with a push rod (35) extending axially through the arm with each end of the rod bearing against one of the components (23,45) of the adjacent joint and means (31) for applying a compressive force to the push rod and thereby simultaneously lock both joints against relative movement.

6 Claims, 2 Drawing Figures

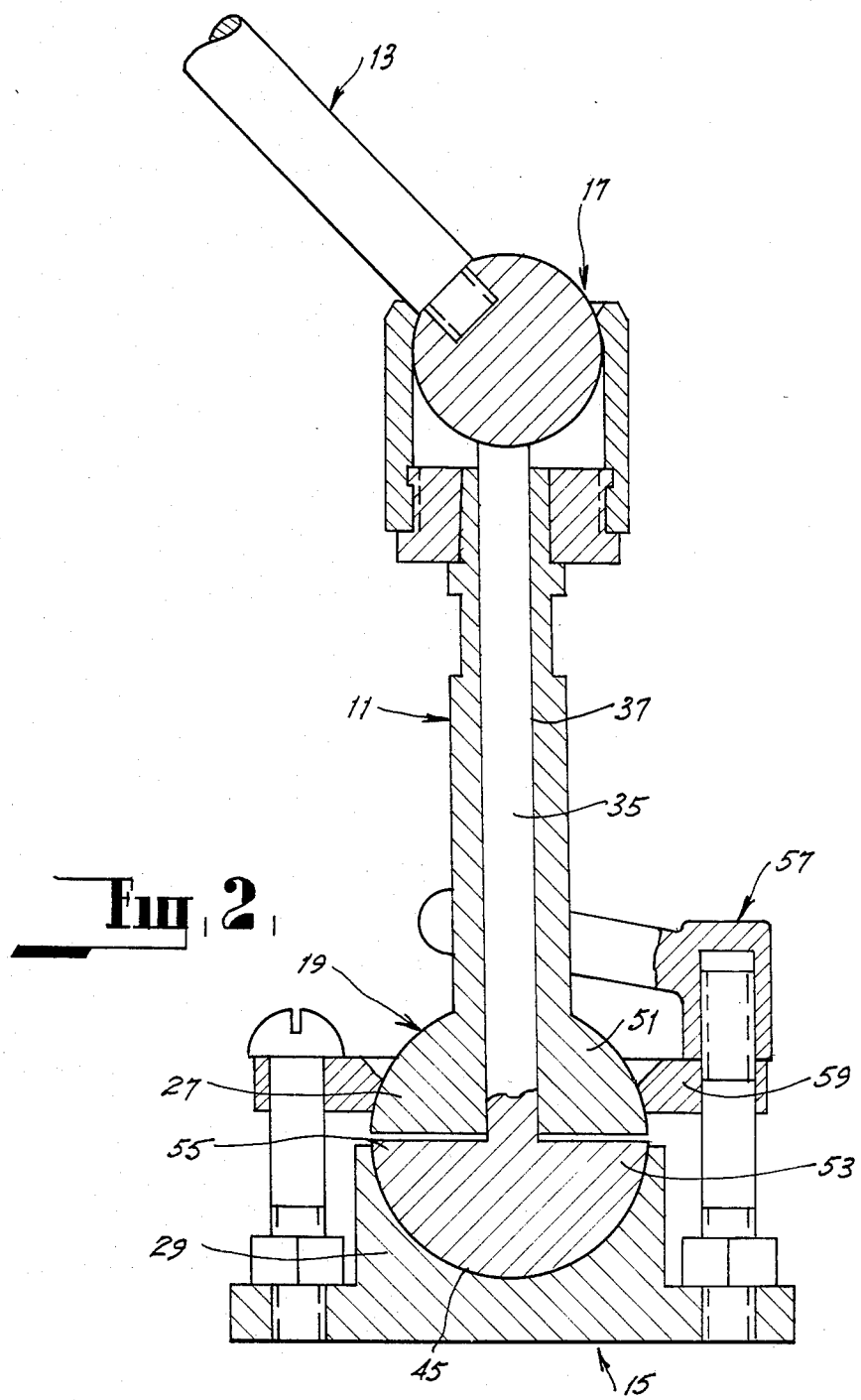

ADJUSTABLE ARM

This invention relates to an adjustable arm and in particular to an arm consisting of a plurality of arm sections disposed in end to end relation with adjacent arm sections interconnected for angular movement therebetween about at least one axis.

Adjustable arms of the type to which this invention relates are well-known. In many situations, it is necessary to lock the arm sections against angular movement to restrain the arm from movement out of a position into which it has been adjusted. To accomplish this, conventional adjustable arms are commonly provided with a locking mechanism at each joint between adjacent arm sections. However, such an arrangement has a disadvantage in that it is necessary to operate the locking mechanisms individually to lock the arm in the desired position and to release the arm to allow for further adjustment of the arm sections. This may be a time consuming and tedious operation, especially if adjustments to the arms position are required to be carried out regularly.

It is an object of the present invention to overcome the above-mentioned disadvantage by providing an adjustable arm in which the arm sections are able to be locked against angular movement in one operation.

Broadly the invention resides in an adjustable arm having a joint at each end capable of movement about at least one axis, a push rod extending axially along the arm with each end in contact with one of the components of the adjacent joint and means for applying a compressive force to the rod, thereby simultaneously locking both joints against relative movement.

More particularly the invention resides in an adjustable arm comprising an intermediate arm section and a pair of end arm sections disposed one at each end of the intermediate section, a joint connecting each end section to the respective end of the intermediate section for angular movement therebetween about at least one axis, each joint having a first part attached to the intermediate section and a second part attached to the respective end section, a push rod extending axially along the intermediate section with the respective ends of the push rod located against said second parts of the joints, and means for effecting relative movement between the intermediate section and the push rod between a first position in which the ends of the push rod are in sliding engagement with the respective second parts of the joints and a second position in which the ends of the rods are in frictional engagement with respect to said second parts.

According to a preferred feature of the invention each joint is either a ball and socket type joint or a knuckle joint.

The invention will be better understood by reference to the following description of two specific embodiments thereof as shown in the accompanying drawings in which:

FIG. 1 is a sectional elevation of an adjustable arm according to the first embodiment; and FIG. 2 is a sectional elevation of an adjustable arm according to the second embodiment.

Referring to FIG. 1 of the drawings, the adjustable arm according to the first embodiment comprises an intermediate arm section 11 and a two end sections 13 and 15, one at each end of the intermediate section. A joint 17 couples one end of the end section 13 to the adjacent end of the intermediate section 11. Similarly, a joint 19 couples one end of the end section 15 to the adjacent end of the intermediate section.

The end section 15 is in the form of a base which is adapted for mounting on a suitable structure such as a workbench, or a stand which may be either portable or fixed in position. The free end of the end section 13 is adapted to support an object such as a clamp (not shown) which may require positional adjustment after attachment to the end section 13.

The joint 17 is in the form of a knuckle joint comprising a fork 21 integral with the intermediate section 11 and an eye 23 mounted on the end section 13. The fork 21 and eye 23 are united by a pivot pin 25. The joint permits relative angular movement between the end section 13 and the intermediate section 11 about the central longitudinal axis of the pin 25.

The joint 19 is of the ball and socket type, the ball 27 being fixed to the intermediate section 11 and the socket 29 being formed integral with the end section 15. The ball 27 is retained in the socket 29 by means of a collar 31 threadedly engaged to the end section 15. The collar 31 is formed with an inturned flange 33 which engages the ball 27.

A push rod 35 is slidably received in an axial passage 37 in the intermediate section 11 and an aligned passage 39 in the ball 27. The end of the push rod 35 corresponding to the ball 27 is formed with an enlarged section 39 which is located in a corresponding enlarged section 41 in the passage 37. The free end 43 of the enlarged section 39 is located against the concave face 43 of the socket 29 and is shaped to conform with the concave face 43. The other end 47 of the push rod is located against the eye 23 of the joint 17. There is a clearance space 49 between the outer face of the ball 27 and the concave face 43 of the socket 29.

Rotation of the collar 31 in the direction which causes it to move in the direction towards the end section 15, urges the ball 27 towards the concave face 45 of the socket, thereby reducing the size of the clearance space 49. The effect of this is that respective ends of the push rod are forced into frictional engagement with the socket 29 and the eye 23. In this way, the joints 17 and 19 are locked so as not to permit angular movement between their respective arm sections.

The embodiment shown in FIG. 2 of the drawings is similar to that shown in FIG. 1 and the same reference numerals are used to identify corresponding parts. In this embodiment the joint 17 is of the ball and socket type to permit angular movement between the arm sections 11 and 13 about a multitude of axes rather than about one axis as was the case with the knuckle joint of the first embodiment.

The joint 19 is of a ball and socket type. The ball 27 is formed in two parts; one part 51 is integral with or fixed to the intermediate section 11 and the other part 53 is integral with or fixed to the push rod 35. The part 53 locates against the concave face 45 of the socket 29. A clearance space 55 is provided between the ball parts 51 and 53 and a clamping mechanism 57 is provided to selectively move the ball part 51 towards the ball part 53 and thereby reduce the size of the clearance space. The effect of this is that the ball part 53 at one end of the push rod is forced into frictional engagement with the socket 29 and the other end 47 of the push rod is forced into frictional engagement with the ball of the joint 19.

The clamping mechanism 57 includes a collar 59 surrounding the part 51 of the ball 27, and a releasable clamping device 61 which is adapted to urge the collar into engagement with the part 51 and thereby effect the locking action.

From the foregoing, it is evident that the present invention provides an adjustable arm in which the arm may be adjusted to any angular position and locked in that position, the locking operation requiring only one locking action.

It should be appreciated that the scope of the invention is not limited to the scope of the embodiments described; for example, although the embodiments described have only three arm sections, an adjustable arm according to the invention may be provided with any suitable number of arm sections.

The claims defining the invention are as follows:

I claim:

1. An adjustable arm having a knuckle joint at one end and a ball and socket joint at the other end, a push rod extending axially along said arm and slidably mounted therein, one end of the rod bearing against the eye of the knuckle joint and the other end of the rod being against the socket of the ball and socket joint and means for applying a compressive force to said rod comprising a collar screwed onto the socket over the ball for simultaneously locking both joints against relative movement.

2. An adjustable arm as claimed in claim 1 wherein part of one of the joints forms a base through which the arm may be mounted on a suitable structure.

3. An adjustable arm comprising an intermediate arm section and a pair of end arm sections disposed one at each end of the intermediate section, a joint connecting each end section to the respective end of the intermediate section for angular movement therebetween about at least one axis, each joint having a first part attached to the intermediate section and a second part attached to the respective end section, a push rod extending axially along the intermediate section with the respective ends of the push rod located against said second parts of the joints, and means for effecting relative movement between the intermediate section and the push rod between a first position in which the ends of the push rod are in sliding engagement with the respective second parts of the joints and a second position in which the ends of the rods are in frictional engagement with respect to said second parts, one of said joints comprising a knuckle joint and the other of said joints comprising a ball and socket joint, one end of said rod bearing against the eye of said knuckle joint and the other end of said rod being against the socket of said ball and socket joint, said means for applying compressive force to said rod is a collar screwed on to the socket over said ball.

4. An adjustable arm as claimed in claim 3 wherein the intermediate arm section is tubular and the push rod is slidably mounted therein.

5. An adjustable arm as claimed in claim 3 wherein part of one of the joints forms a base through which the arm may be mounted on a suitable base.

6. An adjustable arm as claimed in claim 3 wherein the ball has an enlarged bore therein larger in diameter than the rod and the rod is operably engaged with a cylindrical portion contained with the bore and adapted to engage the socket upon the application of a compressive force.

* * * * *